Sept. 3, 1963    M. A. HERMAN    3,102,344
SIMULTANEOUS MULTI-CHECK POINT GAGE
Filed Jan. 20, 1959    4 Sheets-Sheet 1

INVENTOR.
MARTIN A. HERMAN
BY
ATTYS.

Sept. 3, 1963 M. A. HERMAN 3,102,344
SIMULTANEOUS MULTI-CHECK POINT GAGE
Filed Jan. 20, 1959 4 Sheets-Sheet 2

INVENTOR.
MARTIN A. HERMAN
BY
ATTYS.

Sept. 3, 1963   M. A. HERMAN   3,102,344
SIMULTANEOUS MULTI-CHECK POINT GAGE
Filed Jan. 20, 1959   4 Sheets-Sheet 3
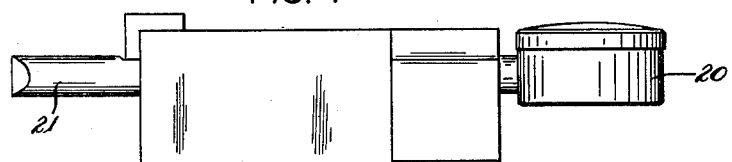
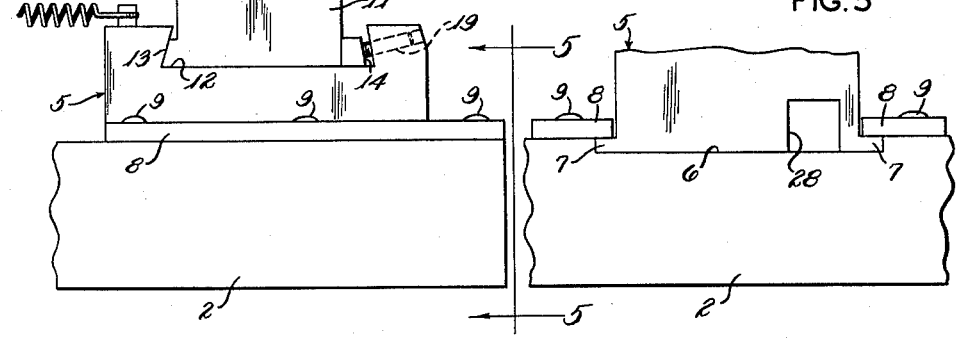
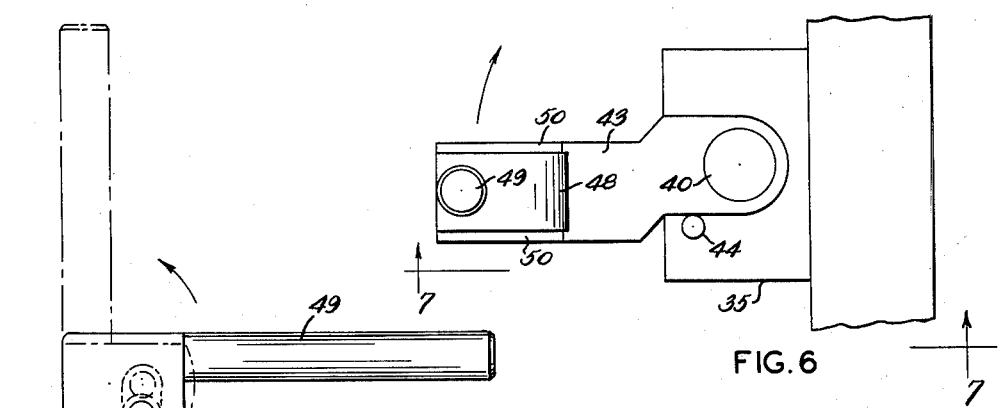
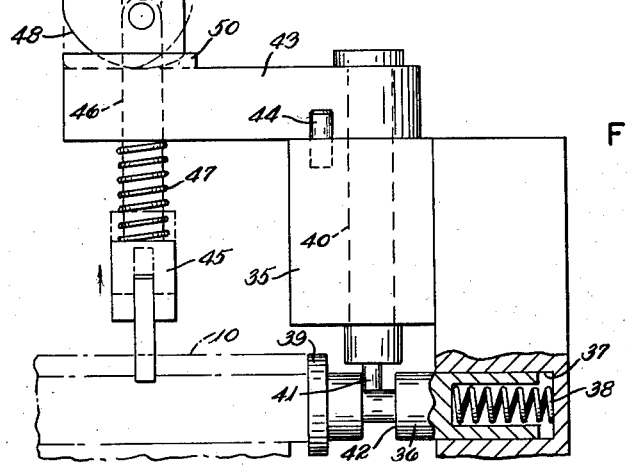
INVENTOR.
MARTIN A. HERMAN
BY Oldham & Oldham
ATTYS.

INVENTOR.
MARTIN A. HERMAN
BY
ATTYS.

United States Patent Office

3,102,344
Patented Sept. 3, 1963

3,102,344
SIMULTANEOUS MULTI-CHECK POINT GAGE
Martin A. Herman, 7316 Dudley Ave., Cleveland 2, Ohio
Filed Jan. 20, 1959, Ser. No. 787,867
3 Claims. (Cl. 33—174)

This invention relates to gages, especially to a novel and improved gage having a plurality of simultaneously controllable check points or gage points provided in the apparatus and wherein unitary control means are provided for a multiplicity of the gage members.

In making a number of articles, such as blades or buckets for use in jet engine type aircraft or similar types of engines, it frequently is necessary to check the dimensions, angles, or other portions of the jet blades to be certain that they conform to accurate specifications set up therefor. It obviously is a very difficult and slow operation to check such jet blades accurately manually when they are made in large numbers. At the same time, it is very necessary that the jet blades be accurately gaged so that they meet desired standards, and will function properly.

The general object of the present invention is to provide a novel and improved type of a gage characterized by its ability to perform a plurality of gaging or test operations simultaneously and where unitary control means are provided for moving several gage members easily and rapidly to and from operative gaging positions.

Another object of the invention is to provide a gage support base with a pair of opposed gage carrying blocks having unitary movement control means connecting the two gage carrying blocks to the support base for simultaneous movement along an axis of the support base.

Another object of the invention is to provide improved clamp means to secure a test article in position in the gage of the invention by quickly engageable and releasable means.

A further object of the invention is to urge a test article longitudinally in the gage to seat properly on article supports in the gage.

Another object of the invention is to clamp a test article in position by a plurality of members that can be moved by a unitary control action to inoperative positions providing clearance in the gage to facilitate removal of the test article.

Another object of the invention is to provide a plurality of measuring or indicating means positioned in a gage so that spring means therein can move all the measuring means as a unit into operative positions and where a unitary control can move all of such means out of engagement with a test piece at one time.

A further object of the invention is to provide an improved gage of relatively uncomplicated construction by which improved gaging results can be obtained.

Still a further object of the invention is to provide an improved gage wherein an end stop can be provided for engaging and securing the article to be checked, and wherein at least a pair of gage means are simultaneously moved into or out of gaging engagement with the test article.

The foregoing and other objects and advantages of the invention will be made more apparent as the specification proceeds.

With reference to the structure shown in the accompanying drawings,

FIG. 4 is a fragmentary enlarged vertical section taken in line 4—4 of FIG. 3 and with the gage support blocks and associated means in position;

FIG. 5 is a fragmentary end elevation taken on line 5—5 of FIG. 4;

FIG. 6 is a fragmentary plan of the control arm or lever used to hold or position an article engaging arm in the apparatus;

FIG. 7 is a fragmentary side elevation taken on line 7—7 of FIG. 6; and

FIG. 8 is an enlarged detail showing the control arm for operating a rack and gear means to move the gage carrying members in the apparatus of the invention.

When referring to corresponding members shown in the specification and referred to in the dawings, corresponding numerals are used to facilitate comparision therebetween.

Figure 1:
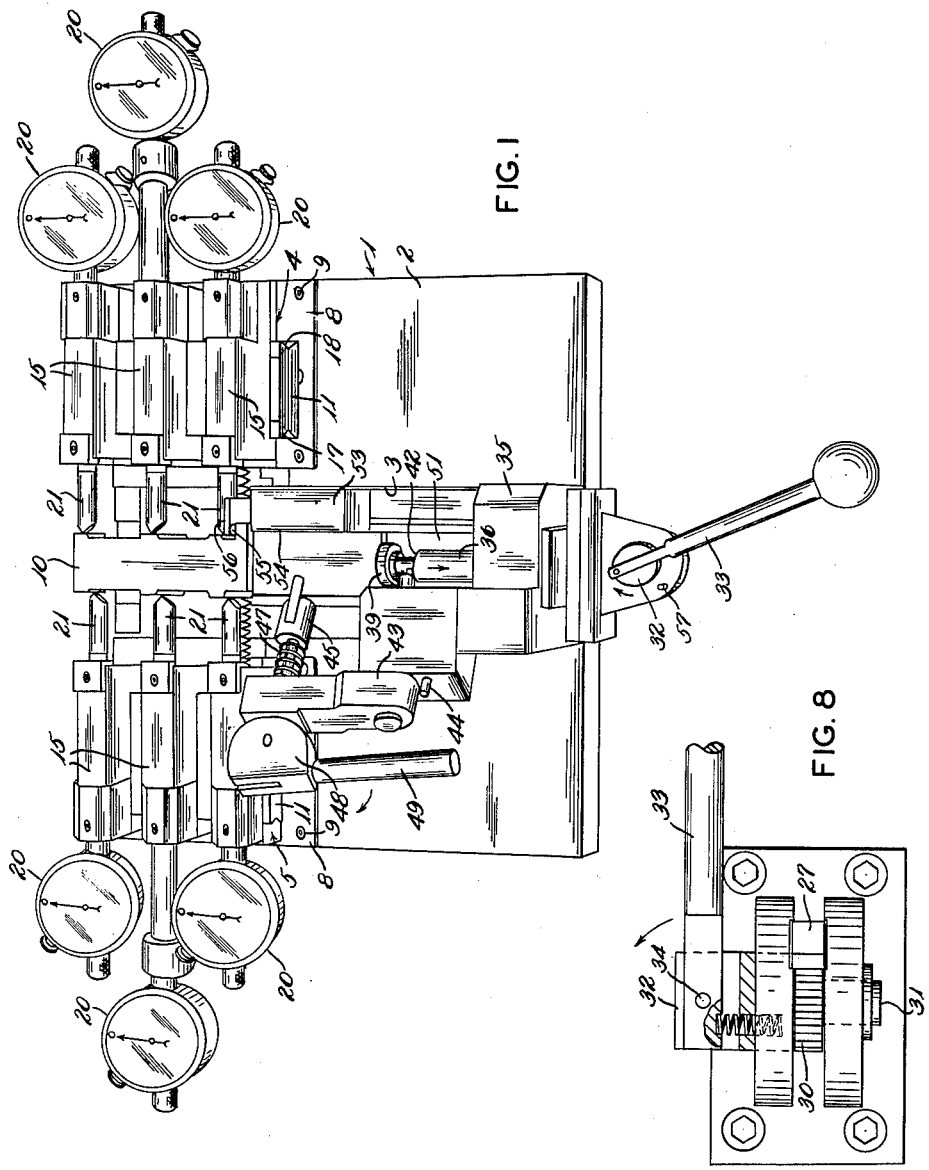
FIG. 1 is a perspective view of a gage embodying the principles of the invention in its closed position.

The present invention, in general, relates to gages, especially gages for simultaneously checking a plurality of dimensions on a test article and wherein the gage comprises a base plate having a center axis, a pair of slides, means positioning the slides for sliding movement on the base plate in a direction normal to the center axis of the base plate and on opposite sides thereof, a support block or member slidably and operatively engaging each of the slides for movement thereon longitudinally of the base plate and parallel to the center axis thereof, individual gage means operatively carried by each of the support blocks and extending inwardly towards each other from oppositely disposed slides for measuring the article to be gaged at a plurality of points thereon, means engaging the slides for moving them as a unit towards and from the center axis of the base plate, and clamp means carried by the base plate to engage a portion of an article and operatively secure it in position on the base plate intermediate the slides for gaging action thereon.

Attention now should be particularly directed towards the accompanying drawings wherein one currently preferred embodiment of the invention is shown in detail, and wherein a gage of the invention is indicated as a whole by the numeral 1. This gage 1 includes a base plate 2 that has a longitudinally extending center recess 3 therein. The base plate 2 also has, of course, a center avis extending along the center of the base plate 2 and normally aligned with or superimposed on the center axis of such recess 3. A pair of slides 4, 5 are provided in the gage 1, and they are positioned by suitable means on opposite sides of the base plate recess 3 so that they are movable only in a direction exactly perpendicular to the center axis of the base plate 2. Thus recesses 6 are provided in the upper surface of the base plate 2 and in which the slides 4 and 5 are slidably received for movement in this desired direction. The slides 4 and 5 having edge flanges 7, FIG. 5, thereon at the edges thereof contact the margins of the recesses 6. Members, such as plates or bars 8, are secured to the base plate 2 by screws 9 or equivalent so that the bars 8 extend over the edge flanges 7 and position the slides 4 and 5 in the recesses 6 for sliding movement therealong.

As a feature of the invention, the slides 4 and 5 both position a plurality of individual gage means or members thereon in a longitudinally adjustable relationship to the center axis or recess 3 of the base plate 2. Thus with the slides 4 and 5 being movable towards and from the center axis of the base plate, as hereinafter described, the position of the gage means in the gage 1 of the invention can be so set up when initially adjusting and setting up the gage 1 as to provide gage actions at desired longitudinally spaced portions of a test article 10 received on the gage 1. In the embodiment of the invention disclosed herein, each of the slides 4 and 5 preferably positions a support bar 11 thereon. Thus each of the slides 4 and 5 has a dovetail recess 12 provided on its upper surface for receiving or engaging complementary shaped shoulders or flanges 13 and 14 provided on the base portion of the support bars 11. The dovetail recesses 12 are so formed on the slides 4 and 5 that the longitudinally extending axes of such recesses are exactly parallel to the center axis of the base plate 2 and with such recesses, of course, being exactly normal to the direction of movement of the slides 4 and 5 towards and away from the base plate center axis.

The actual gage carrying members in this embodiment of the invention comprise support blocks 15, each of which is engaged with one of the support bars 11 and is movable longitudinally thereof. These support blocks 15 each have a dovetail shaped recess 16 provided in its lower surface that snugly receives complementary shaped shoulders 17 and 18 provided on the upper portions of the support bars 11. Any suitable members, such as set screws may be engaged with either the support blocks 15 to bear on the support bars 11, or vice versa, and retain them in a desired locked or fixed position thereon. Likewise similar means, such as set screws 19 engage the slides 4 and 5 for clamping against the shoulder 14 of the support bar 11 received therein to secure such support bar in a given position on the slide 4 or 5. A plurality of gages 20 are secured to each of the support blocks 15 on the outer ends or portions thereof by any conventional means. The gages 20 each include an operative pin or plunger 21 which extends inwardly of the gage 1. These pins or plungers 21 are all exactly parallel with each other and normally are slidably positioned in the associated gages or means 20 and resiliently protrude from their positioning means so as to be movable laterally inwardly and outwardly of the apparatus for gaging action. Normally these pins or plungers 21 are so set that they will indicate a zero reading on the gage 20 with which they are associated when the article to be gaged if of proper size. Thus the gage naturally also would be adapted to indicate either a minus or a plus reading on the size of the article 10 at the specific longitudinal portion thereof with which a given gage 20 and its pin 21 contacts for gaging or measuring action.

Figure 3:
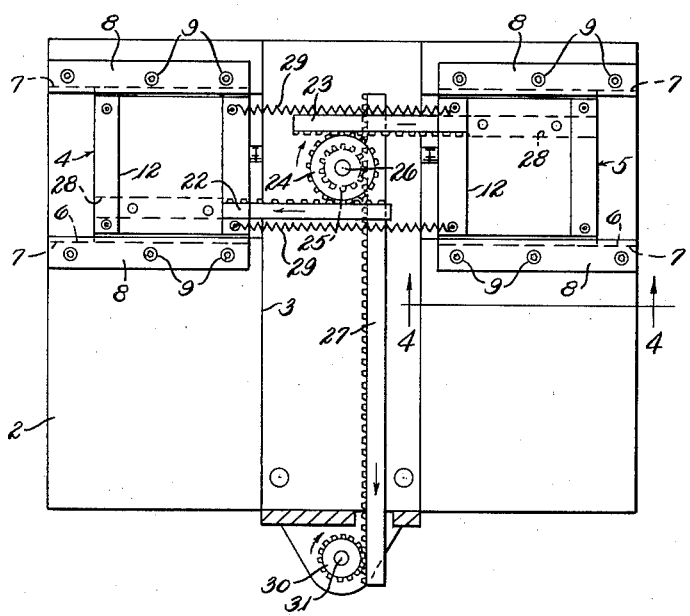
FIG. 3 is a plan, partly in section, of the apparatus of FIGS. 1 and 2 with the gage support blocks thereon being removed.

Controlled movement of the slides 4 and 5 and the gage means operatively associated with each one of the slides is provided in this embodiment of the invention by a gear rack 22 or 23 engaged with each of the slides 4, 5, respectively, and extending inwardly of the gage 1 therefrom across the center axis of the center recess 3. FIG. 3 of the drawings best shows how these gear racks 22 and 23 are secured to axially spaced portions of the slides 4 and 5 and that the gear racks are positioned facing each other. A gear 24 is engaged with both of the gear racks 22 and 23. A second gear 25 is also carried by a shaft, or spindle 26 used to position the gear 24 and with such shaft or spindle 26 being journalled on the base plate 2. Such second gear 25 engages a gear rack 27 that extends longitudinally of the base plate 2 so that longitudinal movement of the gear rack 27 will cause rotation of the gear 25 and thus of the gear 24 to move the gear racks 22 and 23 simultaneously either laterally inwardly or outwardly of the gage 1. The gear racks 22 and 23 move the slides 4 and 5 and any gage means thereon, as units, towards or away from the center axis of the base plate 2 so that the gage means can either be simultaneously moved to operative or inoperative positions, as desired. FIG. 5 of the drawings shows that a recess 28 is provided in the base of each of the slides 4 and 5 in which one of the gear racks 22 or 23 is secured or received. Normally springs 29 are secured to and extend between the slides 4 and 5 for drawing them in towards each other in the gage of the invention.

The actual control movement for the slides 4 and 5 through the gear rack 27 is provided as by means of a gear 30, FIG. 3, journalled on the base plate 2 adjacent one end thereof by a pin or shaft 31. The pin 31 may have an enlarged head 32 provided thereon and a control handle or arm 33 is shown pivotally engaged with such enlarged head 32 by a pin 34. In all events, arcuate movement of the control arm 33 when engaged with the enlarged head 32 of the pin 31 will move the gear rack 27 along its longitudinal axis and will thus provide simultaneous movement of the gage means of the invention in the two sets of gage units provided towards and from the article to be gaged. Hence, rapid movement of the gage to and from operative position to inoperative position is readily achieved.

Article Clamp Means

In order to have effective gaging action, the article to be gaged must be clamped into engagement with the base plate 2 of the gage 1 of the invention. Thus a support bracket 35 is provided at one end of the base plate 2. Such support bracket 35 slidably receives a pin 36, FIG. 7, in a recess 37 provided in one portion of the support bracket. A resilient member, such as a coil spring 38, is received intermediate an end of the recess 37 and a portion of the pin 36 to normally urge the pin 36 to extend from the support block 35 but be resiliently positioned in the support bracket for movement back into the recess 37. The position of this pin 36, which has a head 39 thereon for engaging the article 10 to be gaged, is controlled by means of a shaft 40 journalled in the support bracket 35 and extending exactly normal to the longitudinal axis of the pin 34. Such shaft 40 has a crank pin 41 either secured thereto or formed integrally thereon but eccentrically positioned with relation to the center axis of the shaft 40. The crank pin 41 extends axially from the shaft 40 and engages a slot 42 extending circumferentially of the pin 36. Normally the slot 42 is of greater axial length than the diameter of the crank pin 41 so that some clearance or freedom of movement of the crank pin is provided but with the pin 36 being adapted to be moved along its axis with arcuate movement on the crank pin 41.

The shaft 41 is so designed that arcuate movement thereof will move the control pin 36 to and from operative position for engaging the article 10. The arcuate position of the shaft 40 is controlled through a control arm 43 secured to the shaft 40 and extending therefrom radially thereto. Usually arcuate movement of this control arm is limited in at least one direction, as by a stud 44 secured to the support bracket 35 and extending therefrom to contact the control arm to set the control pin 36 in its operative position.

A clamp bar, plate, or member 45 is provided to bear on the article 10 to hold it in position. The clamp bar 45 is carried on or by a positioning rod 46 slidably engaged with the control arm 43. Normally a spring 47 is compressed between a portion of the clamp bar or plate 45 and an associated portion of the control arm 43 to urge such clamp bar and the rod 46 axially from the control arm 43. The clamp bar 45 is controlled by means of a control cam 48, operatively associated with a clamp arm 49, which clamp arm 49 is pivotally engaged with the upper portion of the positioning rod 46. Usually a pair of edge flanges, or ribs 50 are provided on the control arm 43 and the cam 48 is positioned therebetween to be resiliently retained in engagement with the control arm by the compressed spring 47 and associated means on the positioning rod 46. In all events, swinging the clamp arm 49 to a vertically extending position will cause the clamp bar 45 to be retracted and the clamp bar 45 thus will be released from operative engagement with the article 10. At any time that such release action is secured, the control arm 43 then can be swung about the shaft 40 for moving the headed pin 36 into or out of engagement with the end of the article 10 to lock it in position or to release the article.

It will be realized that the slides 4 and 5 preferably should move exactly perpendicularly to the center axis of the base plate 2, that the axes of the support bars 11 are exactly parallel to the center axis of the base plate 2, that desired surfaces of the support bars 11 and/or blocks 15 may be used as reference surfaces in predetermined relation to the center axis of the base plate, that the blocks 15 may move along the support bars 11 only parallel to the base plate center axis, and that the pins or plungers 21 move only perpendicular to said center axis of the base plate.

It should be realized that the novel clamp means of the invention does effectively engage both the end and an upper portion of an article to be gaged to secure it to a gage base and with such clamp being quickly and readily engageable with or releasable from engagement with an article.

Figure 9:
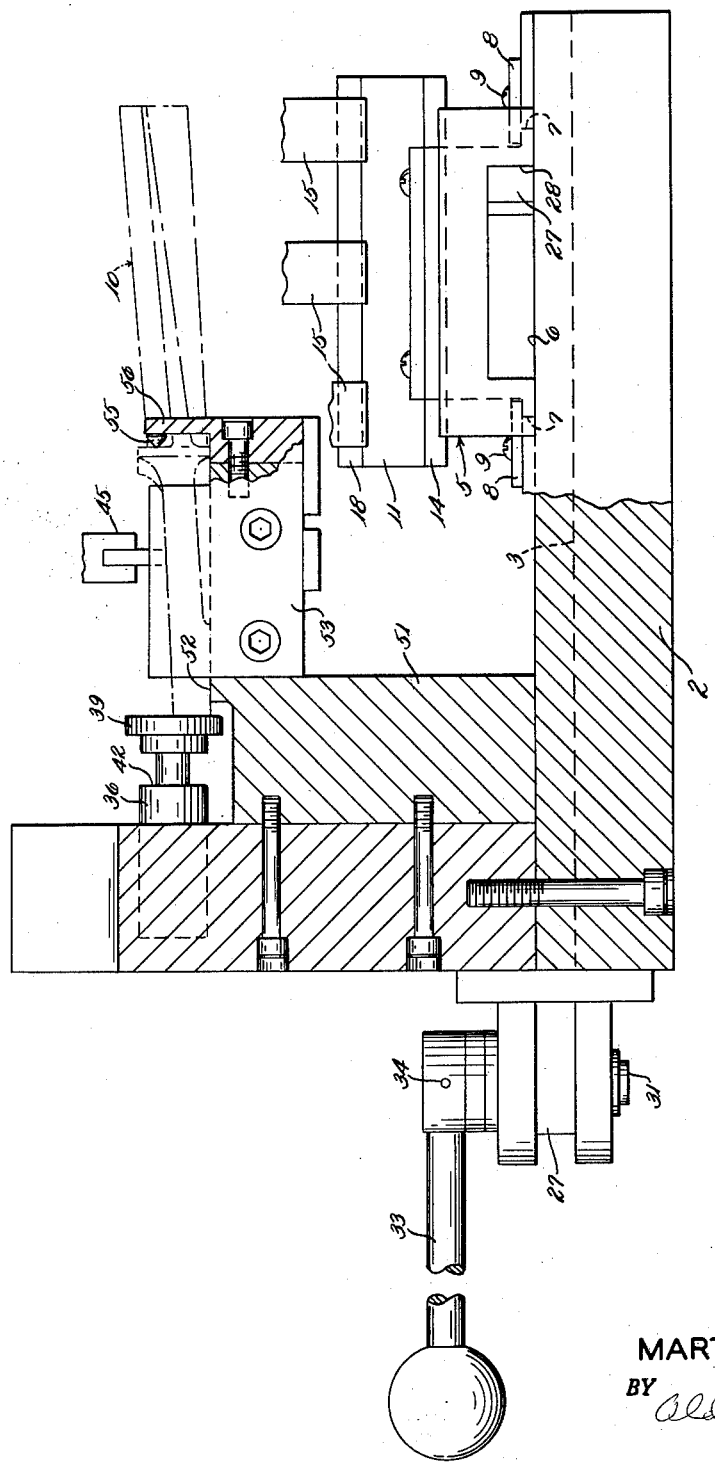
FIG. 9 is a longitudinal vertical section of the article positioning means, partly shown in elevation, of the gage and with certain parts being removed for clarity purposes.

The article 10 in this instance is a set master used to set all of the gages 20 to a zero reading, as the set master is made to the exact dimensions of the articles to be checked in the gage 1. Such articles are positioned on the gage 1 by suitable means to insure the proper and accurate setting of the article for gage action. Hence a support block 51, FIG. 9, is suitably secured to the block 35 or the base 2 on the center axis thereof at about the center of the base. Such support block 51 has a flat upper surface 52, FIG. 2, for receiving the article 10 thereon. A side block 53 is operatively associated with the support block 51 and has a flat surface 54, FIG. 2, extending up from the surface 52 at right angles thereto along one longitudinally extending side thereof.

Figure 2:
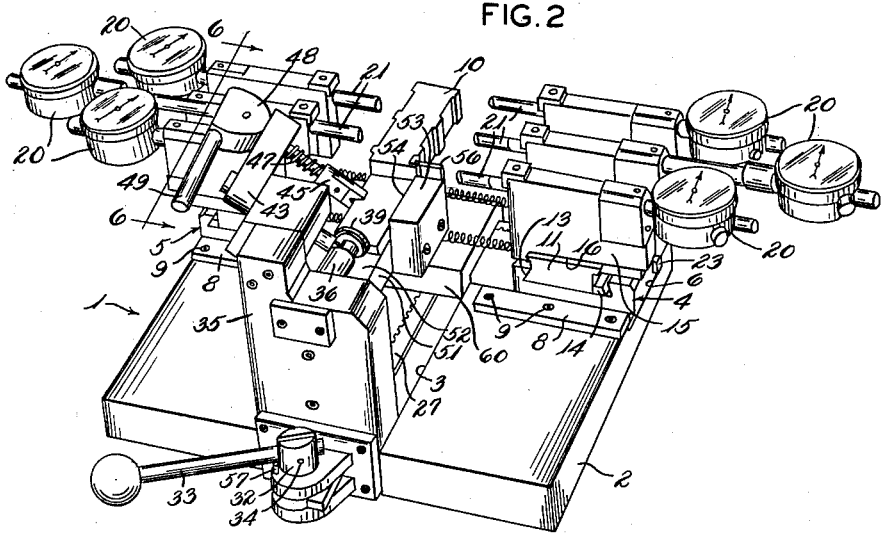
FIG. 2 is a perspective view of the gage of FIG. 1 from a different angle and with the gage being shown in its open position.

The clamp member 45, as shown in FIG. 2, is positioned to be moved downwardly of the gage towards the support block 51 and inwardly toward the side block 53 to engage the set master or article 10 and force it to seat on and against the surfaces 52 and 54. Further positioning of the article 10 is provided by a stop, or pin 55, FIG. 9, that is carried by a plate 56. The plate 56 can be secured to or formed integrally with the side block 53. The article 10 has a shoulder or portion that abuts against such stop 55 to limit longitudinal movement of the article 10 by the pin 36.

It will be realized that any conventional members can be provided for positioning an article 10 on gage 1 to be clamped thereto by the means shown.

The springs 29 pull the slides 4 and 5 and associated means including the gage means thereon inwardly of the gage when they are released. The control arm 33 locks against a pin 57 on the control arm mounting member to lock the slides 4 and 5 and gage means in an open position, FIG. 2.

The slides 4 and 5 may have stops on the inner faces thereof to abut against means, such as the support block 51, when the slides are moved to their innermost positions, or the slides may contact an auxiliary base plate 60, FIG. 2.

The gage of the invention provides a plurality of gage members that can be accurately set in relation to the article to be gaged and then can be rapidly and positively moved to and from operative positions for gaging action.

The improved gage of the invention is of effective, but relatively uncomplicated construction and provides improved gaging action so that the objects of the invention are thought to be achieved.

While one complete embodiment of the invention has been disclosed herein, it will be appreciated that modification of this particular embodiment of the invention may be resorted to without departing from the scope of the invention.

What is claimed is:

1. In a gage, a base plate, a support bracket secured to said base plate, a pin for engaging the end of an article in the gage, which pin is slidably positioned in and extends from said support bracket, resilient means urging said pin outwardly of said support bracket, a shaft journalled in said support bracket and positioned normal to the longitudinal axis of said pin, a crank pin eccentrically carried by said shaft and extending axially therefrom to engage said pin so that arcuate movement of said shaft moves said pin to and from an operative position by engagement of said crank pin therewith, a control arm secured to said shaft and extending radially therefrom, an article engaging clamp slidably carried by said control arm to extend therefrom normal thereto, and a control cam operatively carried by said control arm and engaging said control arm and said clamp to control movement of said clamp towards and away from said control arm for moving said clamp to article release and article engaging positions and to retain said clamp in a given position.

2. In a gage, a base plate, a support bracket secured to said base plate, a support block on said base for receiving an article to be gaged, a side member on said base plate and having a vertically extending flat surface, a pin for engaging the end of an article on said support block to urge it to move longitudinally, which pin is slidably positioned in and extends from said support bracket, a shaft journalled in said support bracket and positioned normal to the longitudinal axis of said pin, a crank pin eccentrically carried by said shaft and extending axially therefrom to engage said pin so that arcuate movement of said shaft moves said pin axially to and from an operative position for engaging a test article on said support block, a control arm secured to the shaft and extending radially therefrom, a clamp member carried by said control arm for engaging a test article and urging it against said flat surface when said shaft and crank pin have moved said pin to an operative position, means to secure said clamp member in an operative position, stop means operatively carried by said side member to engage a test article on said support block on the longitudinal axis of such article and retain it against movement on that axis, gage means, slide means on each side of the center axis of said base plate on which said gage means are operatively positioned, and means for moving said slide means as a unit towards and from the center axis of said base plate.

3. In a gage, a base plate, a support bracket secured to said base plate, a support block on said base for receiving an article to be gaged, a pin for engaging the end of an article on said support block to urge it to move longitudinally, which pin is slidably positioned in and extends from said support bracket, a shaft journalled in said support bracket and positioned normal to the longitudinal axis of said pin, a crank pin eccentrically carried by said shaft and extending axially therefrom to engage said pin so that arcuate movement of said shaft moves said pin axially to and from an operative position for engaging a test article on said support block, a control arm secured to the shaft and extending therefrom, a clamp member carried by said control arm for engaging a test article on said support block when said shaft and crank pin have moved said pin to an operative position, means to secure said clamp member in an operative position, means operatively carried by said base plate to engage an article on said support block on the longitudinal axis of such article and retain it against movement on that axis, gage means, slide means on each side of the center axis of said base plate on which said gage means are operatively positioned, and means for moving said slide means as a unit towards and from the center axis of said base plate.

References Cited in the file of this patent

UNITED STATES PATENTS

| | | |
|---|---|---|
| 2,018,399 | Engst | Oct. 22, 1935 |
| 2,697,879 | Tandler | Dec. 28, 1954 |
| 2,763,934 | Creek | Sept. 25, 1956 |
| 2,839,836 | Fuller | June 24, 1958 |
| 2,854,756 | Aller | Oct. 7, 1958 |
| 2,892,257 | Tandler | June 30, 1959 |